Figure 1:
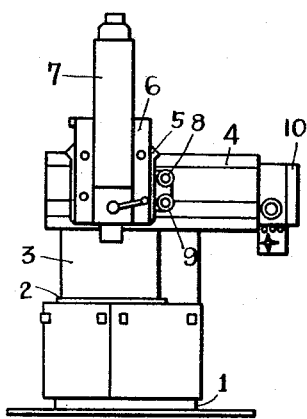

June 27, 1967  KIYOSHI SAWADA  3,327,571
APPARATUS FOR BALANCING THE TOOL CARRIAGE OF
A MACHINE TOOL
Filed May 4, 1965

INVENTOR.

Kiyoshi Sawada
BY Howson & Howson
ATTYS

United States Patent Office 3,327,571
Patented June 27, 1967

3,327,571
APPARATUS FOR BALANCING THE TOOL CARRIAGE OF A MACHINE TOOL
Kiyoshi Sawada, Numazu, Japan, assignor to Toshiba Machine Co. Ltd., Tokyo, Japan, a corporation of Japan
Filed May 4, 1965, Ser. No. 452,986
2 Claims. (Cl. 77—36)

The present invention relates to a weight balancing apparatus for the tool carriage of a machine tool such as a vertical boring machine, turning mill or vertical lathe.

In the machine tool, more particularly in the vertical lathe, there is a need of decreasing power for elevating the tool carriage.

To this end, there have been provided several kinds of apparatus for balancing the weight of the tool carriage. For example, there are in the prior art various apparatus and methods for accomplishing this balancing by means of counter weight, pneumatic cylinder mechanism or hydraulic cylinder mechanism.

In accordance with the method which includes the use of counter weights, the counter weight is connected to the elevating tool carriage by wire hung on a pulley which is supported on a swivel head provided on a front face of a cross rail carriage, or the counter weight is provided in a column, and is connected to the elevating tool carriage through a rack and pinion, rotating shaft, pulley and wire, or the like. In the former case, since the counter weight is provided on the swivel head, the weight often interferes with a copying device or auto-positioning device provided on the elevating tool carriage or the swivel head. In the latter case, the mechanism for connecting the counter weight with the elevating tool carriage becomes complex and is rather large, and frictional resistance in the connecting apparatus increases considerably.

In the method of balancing the pressure in the hydraulic cylinder with the weight of the elevating tool carriage, to keep the pressure in the oil cylinder at a predetermined height, there are used an oil pump and a constant pressure relief valve for applying or exhausting the oil in accordance with height of the tool carriage. In this case, since the oil pump, its driving motor, constant pressure relief valve means, and oil reservoir have much capacity and heavy weight, it is impractical to set this equipment on the tool carriage. Therefore, this equipment is set in the column or on the ground and connected to the oil cylinder by flexible pipes. In accordance with this method, this hydraulic equipment is expensive, and since the oil cylinder is provided on a swivel head which reciprocates or rotates, the flexible pipe mechanism connected to the oil cylinder increases in size as the size of the machine increases.

In the method of balancing the pressure in the air cylinder with the weight of the elevating tool carriage, the air cylinder is connected to an air accumulator which is provided near the air cylinder, and compressed air is supplied into the air cylinder or exhausted from it as the tool carriage elevates or descends. If capacity of the air accumulator is much greater than the varied quantity in the air cylinder, the difference of air pressure caused by moving the elevating tool carriage between upper and lower end position may be neglected.

Therefore, an object of the present invention is to provide an apparatus which may balance air pressure with the weight of a tool carriage without using oil, and which may easily supply air into an air accumulator and regulate the air pressure therein.

In accordance with the present invention, the apparatus comprises an air accumulator and an air cylinder connected to each other by pipe means through valve means comprising a shutoff valve and a check valve, and the air cylinder being operated as a piston pump for supplying compressed air into the air accumulator.

Figure 2:
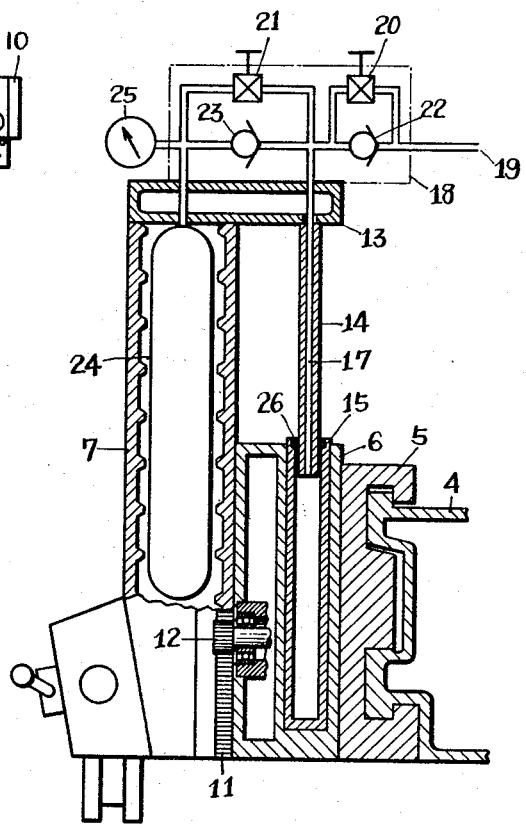

Other objects of the present invention and the various features and details of the operation and construction thereof are hereinafter more fully set forth and described with reference to the accompanying drawings, in which:

FIG. 1 is an elevational front view of a vertical lathe having a weight balancing apparatus for a tool carriage in accordance with the present invention, and FIG. 2 is a sectional side view of the weight balancing apparatus for the tool carriage in accordance with the present invention.

Referring to FIG. 1, reference numeral 1 designates a machine bed, on which is provided a table 2 for rotating the work secured on it. On the machine bed 1, a column 3 is projected near the table 2. On the column 3 is secured a crossrail 4 on which is slidably mounted a crossrail carriage 5. On the crossrail carriage 5 is rotatably mounted a swivel head 6 which guides an elevating tool carriage 7. The tool carriage 7 is elevated by a handle 8, and the crossrail carriage 5 is traversed by a handle 9. The tool carriage 7 and the crossrail carriage 5 are mechanically moved by a driving apparatus 10.

Referring to FIG. 2, on the side of the elevating tool carriage 7 there is secured a rack 11 engaged with a pinion 12 which is connected to the handle 8 and driving apparatus 10 to elevate the tool carriage 7. On the top of the tool carriage 7 is secured an arm 13 from which a plunger 14 projects downwardly. The plunger 14 is slidably inserted in an air cylinder 15, and the air cylinder 15 is sealed by a sealing device 26 to prevent the air therein from leaking out. The plunger 14 is provided with an air duct 17 which is connected to an air accumulator 24 through a pumping valve device 18. The air accumulator 24 is fixedly mounted within the tool carriage 7. The pumping valve device 18 comprises manual actuated shut-off valves 20 and 21 and check valves 22 and 23. The reference numeral 25 designates a gauge indicating air pressure in the accumulator 24.

Generally, driving means for elevating the tool carriage has enough power to elevate the tool carriage without employing the balancing means when cutting work is not carried out. Therefore the driving apparatus 10 can elevate the tool carriage 7 through pinion 12 and rack 11.

In operation, to fill the accumulator 24 with air, the shut-off valves 20 and 21 are shut, and preferably, the opening 19 is connected to a compressed air source. Upon elevating of the tool carriage 7, the air is sucked into the air cylinder 15 from the opening 19 through the check valve 22. Upon descending of the tool carriage 7, the air in the air cylinder 15 is compressed and introduced into the accumulator 24 through the check valve 23. Thus, by vertical reciprocation of the tool carriage 7, the compressed air is fed into the accumulator 24. When the pressure in the accumulator reaches a predetermined value, the reciprocation of the tool carriage 7 is stopped and the valve 21 is opened. Thus, the accumulator 24 is placed in communication with the air cylinder 15, and the compressed air operates in such a manner as to elevate the plunger 14 connected to the tool carriage 7, thus reducing the weight of the tool carriage 7. To exhaust the air from air cylinder 15, the valve 20 is opened.

Upon sucking of the air, if the air compressor is used, the time for filling the accumulator 24 with air may be shortened. Instead of the air accumulator being mounted in the tool carriage 7, the accumulator as mentioned, may be mounted on its guiding member such as the swivel head 6, and the air cylinder 15 may be provided in the tool carriage 7. In this case, the plunger 14 extends downwardly from the bottom of the tool carriage 7.

While a particular embodiment of the present invention has been illustrated and described herein, it is not intended

I claim:

1. A weight balancing apparatus comprising an elevating tool carriage moving along a guiding member, driving means for said elevating tool carriage, an air accumulator mounted in said elevating tool carriage, an air cylinder mounted in said guiding member, a plunger sliding in said air cylinder as the elevating tool carriage moves, valve means for flowing the air from the air cylinder into the accumulator only, means for causing the accumulator to open into the air cylinder, valve means for sucking the air into the air cylinder, and means for opening the air cylinder to discharge the air therefrom.

2. A weight balancing apparatus comprising an elevating tool carriage moving along a guiding member, driving means for said elevating tool carriage, an air accumulator provided in said guiding member, an air cylinder provided in said tool carriage member, a plunger slidably mounted in said air cylinder, valve means for flowing the air from the air cylinder into the accumulator only, means for causing the accumulator to open into the air cylinder, valve means for sucking the air into the air cylinder and means for opening the air cylinder to discharge the air therefrom.

No references cited.

FRANCIS S. HUSAR, *Primary Examiner.*